United States Patent Office 3,769,228
Patented Oct. 30, 1973

3,769,228
METHOD OF TREATING AQUEOUS LIQUIDS TO REDUCE OXIDATIVE AND REDUCTIVE POTENTIAL THEREOF
Joseph B. Michaelson, 6732 Coldwater Canyon Blvd., North Hollywood, Calif. 91606
No Drawing. Continuation-in-part of application Ser. No. 14,836, Apr. 17, 1970, which is a division of application Ser. No. 659,321, Aug. 9, 1967, both now abandoned. This application June 28, 1972, Ser. No. 267,247
Int. Cl. C02c 1/40; C07c 91/26
U.S. Cl. 252—188.3 R
9 Claims

ABSTRACT OF THE DISCLOSURE

Nitroso aryloxy quaternary ammonium compounds, containing a nitroso substituent, oxidazable to $NO_2$ or reducible to $NH_2$ in appropriate liquid media is used to control reductive or oxidative potential of the medium.

REFERENCE TO RELATED APPLICATION

This application is a continuation-in-part of Ser. No. 14,836, filed Apr. 17, 1970 and now abandoned, which application in turn is a division of Ser. No. 659,321, filed Aug. 9, 1967 and now abandoned.

BACKGROUND OF THE INVENTION

This invention relates generally to new compositions of matter and particularly to such compositions which contain a quaternary ammonium moiety. The new compositions have been found to be surprisingly effective in biocidal applications including use as fungicides, bactericides and slimicides and in other applications where control of micro-organisms, directly or through modification of their environment, is desired. Such applications will include, particularly, amelioration of raw sewage by selective destruction of noxious vapor generating organisms such as the *Desulfovibrio desulfuricans*.

The invention is particularly concerned with improved performance of known ammonium radicals through the simultaneous control of the oxidative or reductive condition of the medium in which the radical is to operate. In certain embodiments, the present compounds afford simultaneous control of microbiological and oxidative phenomena, e.g. by destroying microbes and inhibiting rust simultaneously in applications demanding such joint benefits, for example, secondary oil recovery operations.

The invention further is concerned with methods for the in situ generation of $NH_2$ and $NO_2$ substituents in aryloxy quaternary ammonium compound solutions and resultant control of the oxidative or reductive state of such solutions.

PRIOR ART

Quaternary ammonium compounds are well known. The biologic properties of quaternary ammonium compounds are similarly well known. To my knowledge, however, a nitrosoaryloxy moiety has not previously been combined with a quaternary ammonium moiety to form and ionically bonded compound. Nor has it been recognized heretofore that such combination provides a means of closely controlling the oxidative or reductive state of an ammonium containing solution made therefrom to thus enable maximum biological activity from the ammonium radical.

SUMMARY OF THE INVENTION

There have been discovered compounds having the formula

[Q]+[—O—Ar—NO]— in which Q is a quaternary ammonium moiety and Ar is an aryl group. These compounds have been found to exhibit the bactericidal, fungicidal and antiseptic qualities of the ammonium moiety to an increased degree, and to have the property of lessening the reducing or oxidizing propensities of the medium in which the compound is dissolved, thus to increase the biocidal effectiveness of the ammonium moiety.

A typical preparation of these new compounds is carried out as follows: All parts are by weight. To one molar part of dodecyldimethyl amine dissolved in methyl alcohol there is added one molar part of benzyl chloride and the mixture is refluxed for 24 hours. The resultant dodecyl dimethyl benzyl ammonium chloride is mixed with an alcoholic solution containing one molar part sodium metal and one molar part phenol and the mixture heated to 50° C. for 15 minutes. Following cooling to room temperature and filtering off of precipitated sodium chloride, the filtrate, an alcoholic solution of dodecyl dimethyl benzyl ammonium phenoxide is saturated with nitrous oxide gas and let stand for 24 hours. A waxy solid is obtained on evaporative removal of the alcohol.

DESCRIPTION OF THE PREFERRED EMBODIMENTS

The ammonium moiety of the present compound is conventional in structure and is similarly effective biocidally with increased efficiency by virtue of the remainder of the compound molecule, the —O—Ar—NO moiety. This moiety is a nitroso aryloxy radical and may contain an Ar group which is dinuclear, e.g. naphthyl or mononuclear, e.g. phenyl, tolyl, ethylbenzyl, cumyl, resorcyl groups or the like having the O and NO substituents in the ortho or para arrangement. Preferred compounds have p-phenylene radicals as the Ar group and contain up to 2 other substituents selected from hydroxy, chlorine and bromine groups and alkyl groups having from 1 to 4 carbon atoms, e.g. methyl, ethyl, propyl, isopropyl, butyl and isobutyl groups.

The compounds of the present invention may be made by the reaction of a quaternary ammonium halide and an alkali metal ester of the aryl alcohol desired, e.g. sodium phenate, separating the resulting ammonium phenate and by-product salt and reacting with nitrous oxide gas to substitute the nitroso group onto the aromatic ring. Reaction conditions are mild throughout, e.g. room temperature or slightly above and alcoholic media is conveniently used.

EXAMPLES (All parts by weight)

(A) Preparation of the compounds:
(1) Two and three-tenths parts of sodium metal was dissolved in 100 parts of methyl alcohol. To the solution 9.4 parts of phenol was added and on its dissolution 326 parts of coco dimethyl benzyl ammonium chloride was added. After mixing and heating for 15 minutes at 50° C. the solution was cooled to 24° C. and filtered to separate the sodium chloride produced. The filtrate containing coco dimethyl benzyl ammonium phenoxide in alcohol solution is saturated with nitrous oxide using a sparging tube. Reaction to the nitroso phenate occurs over a 24 hour period at room temperature. The alcohol is evaporated off leaving a waxy solid, coco dimethyl benzyl ammonium p-nitroso phenoxide.

(2) Example A–1 is duplicated substituting 10.8 parts of cresol for the phenol. There is obtained a waxy solid, coco dimethyl benzyl ammonium p-nitroso cresoxide.

(3) Example A–1 is duplicated utilizing dodecyl dimethyl benzyl ammonium chloride prepared from 21.3 parts of dodecyldimethyl amine and 12.65 parts of benzyl chloride in methyl alcohol solution by reflux for 24 hours. A waxy solid, dodecyl dimethyl benzyl ammonium p-nitroso phenate is obtained.

(4) Example A-1 is duplicated substituting an equivalent molar amount of lauryl trimethyl ammonium chloride for the chloride used there. The product obtained is lauryl trimethyl ammonium p-nitroso phenate.

(5) Example A-1 is duplicated substituting an equivalent molar amount of dodecylbenzyl isoquinolinium chloride for the ammonium chloride. The product obtained is dodecyl benzyl isoquinolinium p-nitroso phenate.

(6) Example A-2 is duplicated substituting an equivalent molar amount of myristyl methyl pyrrolidinium chloride for the ammonium chloride. The product obtained is myristyl methyl pyrrolidinium p-nitroso phenate.

(7) Example A-1 is duplicated substituting an equivalent molar amount of lauryl ethyl piperidinium chloride for the ammonium chloride. The product obtained is lauryl ethyl piperidinium p-nitroso phenate.

(8) Example A-1 is duplicated substituting an equivalent molar amount of coco methyl pyrrolidinium chloride for the ammonium chloride. The product obtained is coco methyl pyrrolidinium p-nitroso phenate.

(9) Example A-1 is duplicated substituting an equivalent molar amount of 1-(3,4-dichlorobenzyl-1-hydroxyethyl)-2-stearyl imidazolinium chloride for the ammonium chloride. The product is 1-(3,4-dichlorobenzyl)-1-hydroxyethyl-2-stearyl imidazolinium p-nitroso phenate.

(10) Example A-1 is duplicated substituting an equivalent molar amount of lauryl alpha picolinium chloride for the ammonium chloride. The product obtained is lauryl alpha picolinium p-nitroso phenate.

(11) Example A-1 is duplicated substituting an equivalent amount of coco methyl morpholinium chloride for the ammonium chloride. The product obtained is coco methyl morpholinium p-nitroso phenate.

(12) Example A-1 is duplicated substituting an equivalent molar amount of naphthol for the phenol. The product obtained is coco dimethyl benzyl ammonium p-nitroso naphthenate.

(B) Bacteriocidal properties:

Compounds from Examples A-1 to A-12 are tested for bacteriocidal and bacteriostatic effectiveness. Results are interpreted as the lowest effective concentration (=highest dilution) being best. In each test trypticase soya bacteriological medium was placed in test tubes in 5 milliliter amounts. To a series of such tubes each compound A-1 through A-12 was added in amounts ranging from 1 to 500 parts per million (p.p.m.). The treated tubes were inoculated with various micro-organisms and allowed to incubate 24 hours at 37.5° C.

At the end of the incubation period, a reading is taken of growth or no growth, tubes showing growth are discarded. The highest dilution at which no growth occurs is the bacteriostatic concentration; tubes which show no growth are subcultured into fresh media and allowed to incubate at 37.5° C. for an additional 48 hours. Again tubes showing positive growth are discarded. The highest dilution at which no growth occurs is the bacteriocidal concentration. Results typical of each of the A-1 through A-12 compounds against various micro-organisms is given below in Table I.

TABLE I.—COMPOUNDS A-1 TO A-12

| Micro-organism | Bacteriostatic concentration (p.p.m.) | Bactericidal concentration (p.p.m.) |
| --- | --- | --- |
| Salmonella typhi | 15 | 15 |
| Escherichia coli | 1 | 1 |
| Micrococcus aureus | 2 | 2 |
| Streptococcus fecalis | 1 | 1 |
| Pseudomonas fluorescens | 1 | 1 |
| Brown algae | 10 | 10 |
| Green algae | 10 | 10 |

These compounds are seen to be highly effective at notably low levels, particularly against the pseudomonad micro-organisms.

(C) Fungicidal properties:

The technique and materials of Example B are used substituting Saborouds liquid medium for fungi as the medium. Typical results for compounds A-1 through A-12 are given in Table II.

TABLE II.—COMPOUNDS A-1 TO A-12

| Fungus | Fungistatic concentration (p.p.m.) | Fungicidal concentration (p.p.m.) |
| --- | --- | --- |
| Aspergillus niger | 10 | 50 |
| Rhizopus nigrificans | 50 | 500 |
| Penicillium luteum | 10 | 10 |

(D) Sewage amelioration:

The compound coco dimethyl benzyl ammonium p-nitroso phenate (A-1) is particularly effective against biological generation of hydrogen sulfide gas. Other compounds A-2 through A-12 may be expected to be similarly effective. Compound A-1 was evaluated for sewage amelioration properties by treating raw sewage (D-1), aeration tank outfall (D-2), digestion tank outfall (D-3) and clear effluent reclaim water (D-4) by adding compound (A-1) to the various samples (D-1 to D-4) to which had been added tryticose soya bacteriological media. The cultures were incubated seven days at 37.5° C. At the end of the incubation period the cultures were examined for growth of the microbe Desulfovibrio desulfuricans and for the odor of $H_2S$ gas. Results were as follows:

D-1.—Raw sewage water sample—1.0 p.p.m. prevented the growth of Desulfovibrio desulfuricans with no hydrogen sulfide gas being produced.

D-2.—Water sample from aeration tank—1.0 p.p.m. was bacteriostatic for Desulfovibrio desulfuricans with no hydrogen sulfide gas being produced.

D-3.—Water sample from digestion tank—0.5 p.p.m. prevented growth of Desulfovibrio desulfuricans with no hydrogen sulfide gas being produced.

D-4.—Clear effluent water—0.5 p.p.m. prevented growth of Desulfovibrio desulfuricans with no hydrogen sulfide gas being produced.

It is noteworthy that aerobic digestion was continued in the presence of the bacteriocide showing a high selectivity for the undesired pseudomonad.

(E) Rust inhibition and removal: Compounds A-1 through A-12 are tested for rust inhibiting capabilities. Each compound is diluted to concentrations between 50 and 500 p.p.m. in water and flushed through rusted iron pipe several times with dwell times ranging up to several hours. Rust removal is effected in each instance, with those compounds having detergent like radicals, e.g. compound A-1, showing excellent results due to more efficient loosening of adherent scaler rust. Comparative tests for rust inhibition are also carried out with the result of no corrosion in the case of water standing in the pipe section with dissolved amounts compounds A-1 to A-12 between 50 to 500 p.p.m. after several months and quite apparent rust in ordinary water containing pipe sections. It is believed the present compounds may effectively compete for oxidizers in the water, e.g. dissolved oxygen converting the nitroso group by oxidation to $NO_2$ which of course is a known rust inhibitor in the $NaNO_2$ form.

(F) Secondary oil recovery:

It will be evident that in combining the properties of rust inhibition and suppression of $H_2S$ generation the present compounds are ideal additives for brine or other aqueous fluid used to recover additional oil from wells following conventional drilling extraction. The process is well known as the use of various anti-bacterial and anti-corrosive additives, particularly in sour gas fields such as those in Texas. See for example U.S. Pat. 2,733,206 to Prusick and U.S. Pat. 2,472,400 to Bond et al.

Testing of compounds A-2 through A-12 shows that $H_2S$ generation is suppressed as the reducing state of the oil-brine mixture is lessened by reductive conversion of the —NO group to $NH_2$ and the Desulfovibrio desul-

*furicans* are accordingly destroyed and produce no $H_2S$. Simultaneously the NO group at surfaces subject to oxidative attack from dissolved oxygen in the recovery fluid are protected by the preferential oxidation of the —NO group to —$NO_2$.

In addition slime formation is prevented and fouling of lines, pumps and filters is materially reduced. Use concentrations will range between 0.5 and 1000 p.p.m. or higher up to 10,000 p.p.m. for secondary oil recovery solutions.

(G) Surface fungicide:

The compounds A–1 through A–12 are incorporated in various hydraulic materials such as concrete and plaster in concentrations up to 1000 p.p.m. Growth of fungi is inhibited at the surfaces of the formed material. Similarly coating material such as water latex paints may be treated to resist fungi by incorporation of 50 to 1500 p.p.m. of one of the present compounds.

(H) Detergency:

As mentioned hereinabove, those compounds containing fatty acid radicals of known detergent utility retain this property in their present structures so that lard or grease may be effectively removed during biocidal use of these compounds, suggesting use of these compounds as disinfecting additives for cleaning materials, e.g. at concentrations of 1 to 25% by weight.

(I) Controls:

(1) Coco dimethyl benzyl ammonium chloride was tested in the B test series above. Bacteriostatic and bacteriocidal levels were above 100 p.p.m. demonstrating the advantage conferred by addition of the nitrosophenate moiety with the quaternary ammonium moiety.

(2) Nitrosophenol was tested in the B test series above. Bacteriostatic and bacteriocidal levels were not measurable in the test series, demonstrating the surprising nature of biocidal improvement by virtue of addition of a nitrosophenoxy radical to a quaternary ammonium compound.

I claim:

1. Method of treating an aqueous liquid to reduce its oxidative or reductive potential which includes therein an effective amount of a compound having a —NO group reductively convertible to $NH_2$ or oxidatively convertible to $NO_2$ responsive to the liquid potential to correspondingly reduce said potential, said compound being selected from the group consisting of coco dimethyl benzyl ammonium p-nitroso phenoxide;
coco dimethyl benzyl ammonium p-nitroso cresoxide;
dodecyl dimethyl benzyl ammonium p-nitroso phenate;
dodecyl benzyl isoquinolinium p-nitroso phenate;
myristyl methyl pyrrolidinium p-nitroso phenate;
lauryl ethyl piperdinium p-nitroso phenate;
coco methyl pyrrolidinium p-nitroso phenate;
1-(3,4-dichlorobenzyl)-1-hydroxyethyl-2-stearyl imidazolinium p-nitroso phenate;
lauryl ethyl piperidinium p-nitroso phenate;
coco methyl morpholinium p-nitroso phenate;
coco dimethyl benzyl ammonium p-nitroso naphthenate.

2. The method claimed in claim 1 wherein said compound is coco dimethyl benzyl ammonium p-nitroso cresoxide.

3. The method claimed in claim 1 wherein said compound is dodecyl dimethyl benzyl ammonium p-nitroso phenate.

4. The method claimed in claim 1 wherein said compound is dodecyl benzyl isoquinolinium p-nitroso phenate.

5. The method claimed in claim 1 wherein said compound is myristyl methyl pyrrolidinium p-nitroso phenate.

6. The method claimed in claim 1 wherein said compound is coco methyl pyrrolidinium p-nitroso phenate.

7. The method claimed in claim 1 wherein said compound is 1-(3,4-dichlorobenzyl)-1-hydroxyethyl-2-stearyl imidazolinium p-nitroso phenate.

8. The method claimed in claim 1 wherein said compound is lauryl alpha picolinium p-nitroso phenate.

9. The method claimed in claim 1 wherein said compound is coco dimethyl benzyl ammonium p-nitroso naphthenate.

References Cited

Fuson, R. C.: Advanced Organic Chemistry, 1950, John Wiley, pp. 510–11.

MAYER WEINBLATT, Primary Examiner

I. GLUCK, Assistant Examiner

U.S. Cl. X.R.

252—182, 392; 260—247.7 R, 286 Q, 567.5